Jan. 11, 1927.
R. E. HALL
1,613,656
TREATING STEAM BOILER WATER
Original Filed Jan. 3, 1925
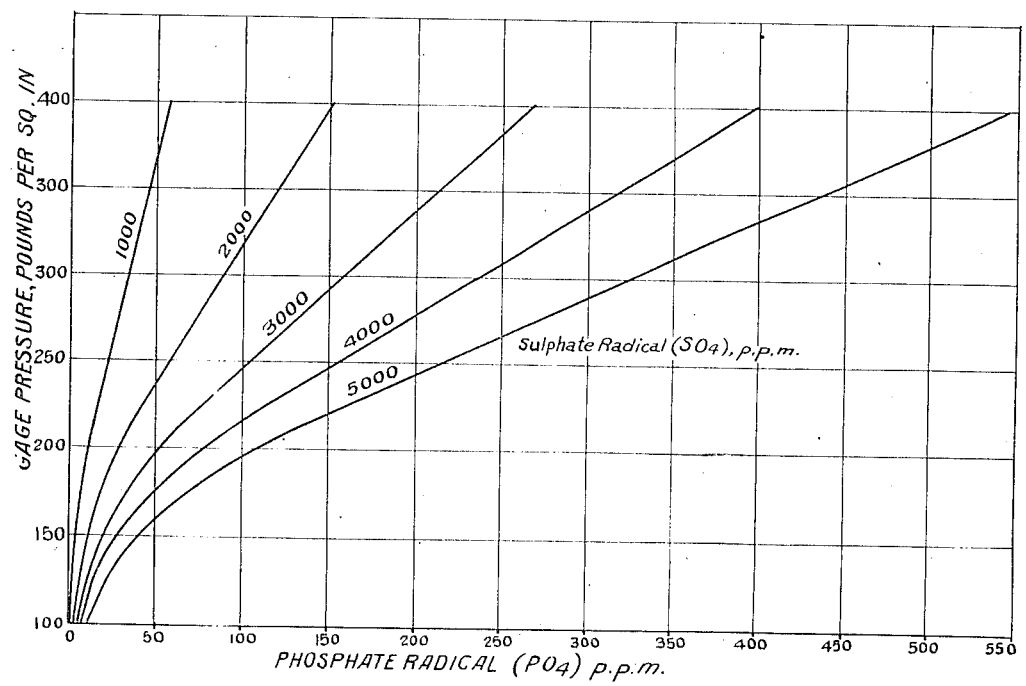
INVENTOR
Ralph E. Hall Patented Jan. 11, 1927.

1,613,656

UNITED STATES PATENT OFFICE.

RALPH E. HALL, OF PITTSBURGH, PENNSYLVANIA, ASSIGNOR TO JOHN M. HOPWOOD, OF DORMONT BOROUGH, PENNSYLVANIA.

TREATING STEAM-BOILER WATER.

Continuation of application Serial No. 351, filed January 3, 1925. This application filed June 28, 1926. Serial No. 119,115.

The present invention relates to the treatment of steam boiler water and more especially to the treatment of steam boiler water to prevent the formation of adherent scale. The process of the present invention is particularly applicable to the treatment of water in boilers operating at relatively high pressures, and in which the rapid decomposition of carbonate radical renders its use uneconomical or infeasible.

This application is a continuation of my copending application Serial No. 351, filed January 3, 1925. It is also a continuation in part of my copending applications Serial Nos. 692,804 filed February 14, 1924, and 718,322, filed June 6, 1924, in which I have described but not specifically claimed, the use of phosphate radical as an alternative for carbonate radical to prevent the formation of adherent boiler scale.

The present invention relates particularly to the maintenance of ionic concentrations in the water in the boiler for the prevention of adherent scale. More specifically, the invention relates to the use of phosphate radical for this purpose, although other radicals may be used. The invention also relates in one of its more specific aspects to the combination of a primary treatment with cheaper reagents, such as soda ash and lime, or a base exchange process for removing the greater part of the scale-forming elements from the feed water, combined with a secondary treatment with a stable radical to prevent the formation of scale in the boiler by the scale-forming elements not completely removed by the primary treatment.

Practically all natural waters contain greater or less amounts of impurities. When a natural water is subjected to evaporation, the concentration of the non-volatile impurities undergoes change. The results ensuing from such change in concentration depend to a large extent upon the temperature at which evaporation takes place, since the solubility of such non-volatile ingredients either decreases or increases with an increase of temperature.

Whatever the source of waters, we may arbitrarily classify them in two ways. In the first place, they may vary largely as to their acidity. Thus waters which are derived wholly or in part from coal mine drainage are almost certain to contain combined sulphate and high hydrogen ion concentration due to free acid. Waters derived from wells and springs are usually characterized by the presence of bicarbonate radical; and oftentimes also of dissolved carbon dioxide due to which a higher hydrogen ion concentration than that of pure water obtains. The waters from surface drainage in general, such as those in the lakes and rivers, usually contain an amount of bicarbonate which is far less than that found in wells, and also a considerable quantity of combined sulphate radical. These are usually relatively low in acidity.

In the second place, waters may be considered from the standpoint of their calcium and magnesium content in relation to their acidic radicals for it is largely the salts of these metals which enter into adherent scales. The waters which have high hydrogen ion or bicarbonate concentration are, in general, those which contain the most calcium and magnesium salts. Likewise, it is these waters in general, and especially the former, that result in the highest concentration of acidic radicals in the boiler water and will therefore require more attention when used as feed water in boiler operation.

When natural waters, with or without treatment, are evaporated in boilers, the water in the boiler, as a rule, becomes saturated with certain constituents as concentration goes on, and deposition of solid phase occurs. The solids deposited may be in the form of a non-adherent sludge, (favorable condition) or of adherent scale (unfavorable condition). A study of the composition of scale and sludges found in the boiler itself and in the steam-line deposits resulting from the suspended material carried over in the steam when the water was not treated or else treated with soda ash, or soda ash and lime, has given the following results:

The materials which are found as sludges and steamline deposits in general, consist mainly of calcite ($CaCO_3$), brucite $Mg(OH)_2$ and hydrous magnesium silicate, rarely more than a small percent of anhydrite ($CaSO_4$), and variable proportions of iron hydroxide and silica. The adherent scales, in general, are characterized by their large content of anhydrite or hydrous magnesium and calcium silicates, in relation to their content of brucite, calcite, silica and iron hydroxide.

While the calcium carbonate is precipitated in the form of a sludge, a small amount of it may enter into the composition of a thin film which sometimes forms on the boiler surfaces. This thin film consists usually of about 85% calcite, 10% hydrous magnesium silicate, and 5% iron hydroxide and silica. It is soft and porous and very readily permeable by the water. It does not increase in thickness when a suitable ratio of carbonate to sulphate and the sufficient concentration of hydroxide ion is maintained in the water in the boiler. It flakes off readily and is carried away by the circulation of water. This thin calcite film is not particularly objectionable and is to be distinguished from the hard adherent scale which grows in thickness, which is relatively impermeable by water and which is detrimental to heat transfer at the boiler surfaces.

There are two types of hard adherent scale which are characterized by a growth in thickness as evaporation proceeds.

(a) A scale which consists principally of anhydrite, is very dense, hard and impervious to water. It frequently contains as high as 90 to 95% of anhydrite.

(b) Another type which may contain little, if any, anhydrite, but is made up principally of hydrous magnesium and/or calcium silicate, with or without calcite. It is also very dense, hard and impervious to water.

The first type occurs alone more frequently than the second type. Mixtures of the two types in various proportions are commonly found. In these mixtures the first type is usually the predominating constituent.

The identification of these different minerals in the solid phase developed has not been limited to examination by chemical analysis alone, but has been accomplished by means of analysis with the petrographic microscopic, as discussed in my article "Solid phases developed in boiler waters", published in the Transactions of the American Institute of Chemical Engineers, vol. 16, part 11, pp. 91-117 (1924).

The deposition of those components which are found as adherent scale when the boiler is opened occurs mainly in situ and the small crystals, in general, have never been at liberty to move with the flow of the boiler water. There has been considerable misconception on this point in the past, and the belief has been freely expressed that precipitation occurs throughout the mass of the water in the boiler, whence the crystals finally lodge on the surfaces and remain as scale. Definite proof of the deposition in situ has been obtained by a chemical balance made upon the constituents entering and leaving a boiler over a 42-day period and in checking up the amount of suspended material in the boiler water at various times in relation to the amount of scale being deposited on the heating surfaces.

It has been further proved by an examination of thin sections of adherent boiler scales under the microscope. Thus, at points at which some break has occurred in the scale, further deposition shows not a smoothing out of the sharp outlines of this break, but the definite layers which characterize the various conditions under which the scale formed, follow in detail the outline of the fault or break in the previously laid down scale. Further, examination of a section of anhydrite scale under crossed Nicol prisms shows that the axes of the crystals are closely parallel to each other and that the major dimension of the crystal is normal to the surface on which the scale was deposited, and further that crystal growth takes place with the formation of elongate crystals growing radially and continues over a considerable period, since the direction remains fixed across several of the little layers which represent differences in operating conditions.

In a study of the relation existing between the slope of the temperature-solubility curve of any substance and its point of precipitation as solid phase, I have found that those substances which increase in solubility with temperature increase deposit in the boiler mainly as non-adherent or sludge-forming components, and that those whose solubility decreases with temperature increase deposit mainly as adherent scale.

The prevention of scale formation, therefore, means so to control the concentrations of the various constituents in a boiler water that those substances whose solubilities decrease with temperature increase shall never be the solid phase in equilibrium with the salts in solution in the boiler water.

Specifically, it is necessary to prevent the deposition of anhydrite or other form of calcium sulphate in the boiler water, and to control the amount of calcium or magnesium silicate which may be present in solution by limiting the amount of calcium or magnesium ion which may be present in the boiler water. Specifically, also it is necessary to provide for the precipitation of calcium and magnesium in the form of non-adherent sludge-forming substances. Methods which are available for acomplishing this purpose and a specific example of treatment have been pointed out in my copending applications, Serial No. 692,804, filed February 14, 1924; and Serial No. 718,322, filed June 6, 1924. For boilers operating at not too high pressures, it is convenient and economical to use sodium carbonate and thus make calcium carbonate and magnesium hydroxide, the stable solid phases in equilibrium with the calcium and magnesium ions, respectively, in the boiler water.

Since at these operating pressures, calcium carbonate is a desirable solid phase in equilibrium with the calcium ions of the boiler water, and since anhydrite is an undesirable solid phase; since also the slopes of the solubility curves of calcium carbonate and calcium sulphate are different in sign, the amount of excess carbonate concentration which must be maintained in the water in the boiler becomes a function of the pressure at which the boiler operates and the sulphate concentration in the boiler water.

The higher the boiler pressure, other factors remaining the same, the greater is the carbonate concentration necessary to prevent scale formation. Also, at higher pressures and consequently higher temperatures, carbonate is more readily decomposed to yield carbon dioxide which passes off with the steam.

Of these two factors, the decomposition of carbonate at the higher pressures, temperatures and boiler ratings is the most serious limiting factor in the use of sodium carbonate. While the use of sodium carbonate for preventing the formation of adherent scale is satisfactory at boiler pressures, say in the neighborhood of 100 to 150 pounds per square inch pressure, I have found that it is not practicable at boiler pressures in excess of about 250 pounds per square inch, if the sulphate concentration of the feed water is considerable, unless a large blow down is resorted to. In fact, it is frequently very difficult to maintain, by the use of sodium carbonate, a correct carbonate-sulphate ratio at pressures in excess of 175 pounds, due to the rapid decomposition of the carbonate radical.

The decomposition of carbonate develops hydroxyl concentration. While hydroxyl ion is necessary for controlling the concentration of magnesium silicate "A system of boiler water treatment based on chemical equilibrium" by R. E. Hall, Journal of Industrial Engineering Cremistry, vol. 17, No. 3, pp. 283–290 (1925), and tends to minimize corrosion "Water treatment for continuous steam production", by R. E. Hall, Mechanical Engineering, vol. 46, No. 11a, pp. 810–817 (1924), the high concentrations which develop at the higher operating pressures and which must reach proportions in no wise permissible in safe boiler operation in order to maintain the necessary carbonate concentration at these higher pressures, are a positive detriment to the boiler because of the dangers of embrittlement of steel, and of augmenting the amount of moisture in the steam. Also, as pointed out in my application, Serial No. 718.322 an excess hydroxide concentration tends to form an adherent calcium hydroxide scale. The decomposition of the carbonate also introduces carbon dioxide into the steam, which is corrosive in its action upon wet steam-line surfaces.

The solution of the problem of preventing adherent scale formation in boilers operating at pressures in which the use of carbonate is not feasible, lies in the substitution for the carbonate radical of one which is not decomposed at these operating pressures. A phosphate or fluoride of an alkali metal furnishes a radical that is stable at these higher operating pressures and that can be used to prevent the deposition of adherent scale.

I prefer to use phosphate radical and precipitate the calcium salts as calcium phosphate, preferably tricalcic phosphate or a basic modification consisting of tricalcic phosphate and calcium hydroxide. Under these conditions, magnesium will precipitate either as magnesium hydroxide or magnesium phosphate. I prefer to use trisodium phosphate as the source of the phosphate radical, although other alkali metal phosphates may be used, or the phosphate radical may be supplied by the use of phosphoric acid or an acid phosphate salt. While I prefer to use the phosphate radical, other stable radicals may be used which will prevent the formation of the hard adherent boiler scale, such for example, as fluoride, arsenate, etc., preferably supplied in the form of sodium or patassium salts. By the term "stable" radical, I mean a radical whose effectiveness in preventing the formation of adherent scale is preserved at the higher boiler pressures and which is not decomposed and lost in the steam, as is the case with carbonate.

Since phosphate is the radical which it is preferred to use, the invention will be described with particular reference to such embodiment, although it is to be understood that the invention in its broader aspects is not necessarily limited thereto.

Three combinations of calcium with the phosphate radical are possible:
1. Mono-calcium dihydrogen phosphate, $Ca(H_2PO_4)_2$
2. Calcium hydrogen phosphate, $CaH(PO_4)$.
3. Tricalcic phosphate, $Ca_3(PO_4)_2$ which frequently has the characteristics of a basic salt, due to the presence in it of further CaO.

The calcium salt which precipitates in any given solution containing phosphate is governed by the hydrogen ion concentration of the solution.

Thus, at room temperature (about 20°C.) when the hydrogen ion concentration is that which corresponds to the acid end-point of methyl orange, mono-calcium dihydrogen phosphate, $Ca(H_2PO_4)_2$, is the stable solid phase. If the hydrogen ion concentration corresponds to the end-point of phenolphthalein, then calcium hydrogen phosphate, $CaHPO_4$, is the stable solid phase. If, however, there is excess hydroxyl concentration in the solution so that the hydrogen ion concentration is very small, then tricalcic phosphate, $Ca_3(PO_4)_2$, or its basic modification will be deposited as solid phase. This is the form most desired, since the amount of calcium removed from the boiler water for any stipulated amount of phosphate is greater than in the other two forms. However, calcium hydrogen phosphate may become solid phase when conditions are not closely regulated. One of the conditions, therefore, to be met in conditioning the boiler water should be to favor the deposition of tricalcic phosphate as solid phase.

What has been said in regard to calcium applies as well for magnesium, although there is a tendency for the magnesium to be precipitated as the hydroxide at the higher hydroxyl concentration.

When conditions are maintained so that the tricalcic or trimagnesium phosphate is precipitated, the excess concentration of phosphate radical which must be maintained is much less than the concentration of carbonate radical that would have to be maintained under the same conditions. This is the case because of the lower solubility of the tricalcic phosphate when the hydroxyl concentration is maintained suitable for preventing its hydrolysis and for controlling corrosion. It is subject, however, to similar variation with the sulphate concentration in the boiler water, and the operating pressure of the boiler. Thus, the general statement of the concentration to be maintained is as follows:

$$A. \quad [PO_4^{---}] > \left[\frac{K^{1/2}_{s.p.\ Ca_3(PO_4)_2}}{K^{3/2}_{s.p.\ CaSO_4}}\right] \times [SO_4^{--}]^{3/2}$$

(at the temperature of water in the boiler.)

in which $[PO_4^{---}]$ and $[SO_4^{--}]^{3/2}$ are expressed as milliequivalents per 1000 grams of solution; and $K_{s.p.}$ means solubility product constant.

The entire conditioning of the boiler water may be done with a phosphate salt. However, where waters contain more than a few parts per million of calcium and magnesium, it is preferable to remove the bulk of the calcium and magnesium from the feed water by a primary treatment with cheaper reagents before introducing the feed water into the boiler. For example, the bulk of the calcium and magnesium may be removed from the feed water by means of a base exchange process, such as a zeolite process, or by means of a lime and soda ash treatment. By such process the calcium and magnesium may be removed from the feed water to the limit of their solubility equilibrium with either the base exchange material or with the lime and soda ash, and the necessary amount of the more expensive phosphate may be reduced from the amount chemically equivalent to the calcium and magnesium originally in the feed water, plus the excess necessary to maintain the equilibrium relations above noted, to an amount chemically equivalent to the calcium and magnesium remaining in the feed water after the primary treatment, plus the excess necessary to maintain the equilibrium relations above noted.

The salts precipitated by the primary treatment are separated from the feed water in any convenient sludge removing apparatus. Throughout the discussion the term "salt" is given the significance of a material which consists of the positive metallic component and a negative component, and is employed as a term of general definition to include calcium and magnesium hydroxides, as well as the sulphates, carbonates, etc. The feed water, free from suspended impurities, is fed into the boiler.

The prevention of the formation of hard adherent anhydrite-containing boiler scale depends upon maintaining in the boiler water a sufficient concentration of phosphate or other favorable negative ion so that calcium is precipitated as calcium phosphate or other calcium sludge rather than as calcium sulphate. Expressed in chemical formulæ, the concentration of the phosphate ion should be maintained so that when calcium is precipitated the following conditions shall obtain:

$$B. \quad [Ca^{++}]^3 \times [PO_4^{---}]^2 = K_{s.p.\ Ca_3(PO_4)_2}$$

(at the temperature of the water in the boiler.)

$$C. \quad [Ca^{++}] \times [SO_4^{--}] < K_{s.p.\ CaSO_4}$$

(at the temperature of the water in the boiler.)

The general statement of formula B above is as follows:—

$$D. \quad [Ca^{++}]^a \times \left[\begin{smallmatrix}\text{Favorable}\\ \text{ion}\end{smallmatrix}\right]^b = K_{s.p.}$$

(of the favorable solid phase at the temperature of the water in the boiler.)

where $a$ and $b$ are exponents required by the ionization equilibrium of the favorable solid phase.

Since $PO_4$ in the water in the boiler is not decomposed at temperatures encountered in boiler operation, it becomes a simple matter to maintain the relations set forth above, that is:

$$E. \quad [PO_4^{---}] > \left[\frac{K^{1/2} \text{ s. p. } Ca_3(PO_4)_2}{K^{3/2} \text{ s. p. } CaSO_4}\right] \times [SO_4^{--3/2}]$$

(at the temperature of water in boiler.)

The maintenance in the boiler water of this relation between phosphate and sulphate will also prevent the formation of calcium-silicate scale.

In order to put this information into available form for the boiler operator, two methods of procedure will usually be followed. According to the first method, the operator may be instructed to maintain, by regulating his blow-down, a sulphate concentration which will not exceed a certain predetermined maximum and to maintain the phosphate concentration not less than a predetermined minimum. This involves the control of sulphate concentration by the blow-down and allows the phosphate concentration to be fixed. The second method is to allow the operator to blow down as necessary and to furnish the operator with a table or chart showing the minimum phosphate concentration necessary to prevent scale formation at various sulphate concentrations. Since, with any particular boiler, the pressure and therefore the temperature of the water remains substantially constant, such chart may be made up for the particular boiler in question and the operator need not concern himself about the temperature factor.

As hereinafter more fully described, the operator can readily determine the sulphate and phosphate concentrations by a simple test apparatus.

The data furnished the boiler room operator is worked up from the solubilities of tricalcic phosphate and calcium sulphate and their percentages of ionization over the range of pressures and concentrations of sulphate to be encountered. Since the calcium sulphate produces scale in the form of anhydrite (a crystalline form of calcium sulphate), the solubility of calcium sulphate in the anhydrite form is the solubility to be considered. I will now discuss in more detail the data upon which the operation directions are based:

Since no data to my knowledge exist in the literature on the solubility of tricalcic phosphate at temperatures characteristic of boiler waters, it has been necessary experimentally to determine the values; and the solubility found is 3.3 parts per million when the hydroxide concentration is sufficient (from 100 to 300 parts per million) to largely inhibit any hydrolysis of the salt. Throughout the specification concentrations are expressed as parts of weight of the solute or chemical equivalent of the solute, in parts of weight of the resulting solution. The solubility is so small that its change with temperature increase or decrease is less than the experimental error of the determination. That the solid phase is of non-adherent character, however, has been demonstrated in boilers operating at above 300 lbs. gage pressure, over a period of many months, in which conditions have been maintained to insure calcium phosphate as the stable solid phase in equilibrium with the calcium salts in solution in the boiler water. No adherent scale formed; some of the sludge produced in the boiler water gave the following analysis:

|  | Per cent. |
|---|---|
| $SiO_2$ | 8.1 |
| $Fe_2O_3 + Al_2O_3$ | 20.5 |
| $CaO$ | 34.9 |
| $MgO$ | 4.1 |
| $SO_3$ | 1.1 |
| $P_2O_5$ | 25.2 |
| $CO_2$ | 0.5 |
| Moisture at 105 C. | 0.8 |
| Net ignition loss | 4.0 |

It has been necessary to determine by direct methods the solubility of anhydrite at boiler-water temperatures, since no values have heretofore been available other than those determined by A. C. Melcher by indirect means. (J. Am. Chem. Soc., vol. 32, pp. 56–66, (1910)). For the temperatures of usual interest in boiler operation, the solubility values are as follows:

| Temperature, degrees centigrade | Gage pressure, lbs. (approximate). | Concentration of $CaSO_4$ parts per million. |
|---|---|---|
| 170 | 100 | 170 |
| 185 | 150 | 110 |
| 200 | 210 | 77 |
| 215 | 290 | 56 |
| 230 | 390 | 52 (extrapolated) |

In order to obtain values for the solubility products of tricalcic phosphate and of calcium sulphate, it is necessary to know their percentage of ionization in saturated solution at the temperatures desired. Since salts of like ionic type ionize to a similar degree (Noyes, A. A. and Falk, K. G., J. Am. Chem. Soc., vol. 34, pp. 454–485 (1912), and since values for $MgSO_4$ have been carefully worked out, (Noyes and co-workers, Carnegie Institution Publications, No. 63, (1907)), there is no difficulty in deriving these values for calcium sulphate.

Exact data at elevated temperatures for a salt of the type of tricalcic phosphate are unknown; but because of its slight solubility, the error involved in the use of the ionization values of $MgSO_4$ will be satisfactory for this purpose, since (1) at such large dilutions, the actual error is small in any event; (2) the error involved will give too high rather than too low a value for the solubility product, and hence for the phosphate concentration which must be maintained, thereby making more certain that calcium phosphate will be the stable solid phase in equilibrium with the calcium salts in solution in the boiler water; and (3) the solubility product of calcium phosphate enters into the formula as the square root, thus making the effect of any error less.

The relation of sulphate and phosphate in formulas A to E inclusive has been in terms of ionic concentrations, and this form is not readily adaptable to the analytical operations for determining concentrations in the boiler room. The ionic concentration should therefore be expressed in parts per million of the total sulphate or phosphate present.

The ionization of $K_2SO_4$ at elevated temperatures is given by Noyes and co-workers (loc. cit.), whence that of $Na_2SO_4$ may be obtained. That of $Na_3PO_4$ has not been determined to my knowledge. However, its ionization at ordinary temperatures is not largely different from that of $K_2SO_4$, (Landolt-Bornstein Tabellen, 5th edition (1923), pp. 1088–9), and for the relatively low concentrations of $PO_4$ required in all cases, the error involved in assuming the ionization of $K_2SO_4$ will not be detrimental. In addition, any error will be in the direction of off-setting the error introduced in determining the solubility product.

Finally, by reason of application of the isohydric principle, the degree of ionization for both $Na_2SO_4$ and $Na_3PO_4$ is based upon the same total ionic concentration in the boiler water.

As a specific example, I will derive the necessary $PO_4$ concentration in parts per million to be maintained when the temperature of operation is 200° C. (210 lbs. gage pressure), and the sulphate concentration is 2000 parts per million. (The chloride concentration is assumed to be low).

$K_{s.\ p.\ Ca3(PO4)2}$ at 200° C ......... $28.2 \times 10^{-8}$
$K_{s.\ p.\ CaSO4}$ at 200° C ............ 0.212
Per cent ionization of $SO_4$ and $PO_4$ ............................ 56

Then, $$F. \quad \frac{PO_4}{31.7} \times \frac{56}{100} = \frac{(28.2\ 10^{-8})^{1/2}}{(0.212)^{3/2}} \times \left(\frac{2000}{48} \times \frac{56}{100}\right)^{3/2}$$

G. or, $PO_4 = 35$ p. p. m.

The curves shown in the drawing represent series of points thus worked out. The $PO_4$ concentration as indicated by the curves for any pressure and sulphate concentration, is sufficient to insure that tricalcic phosphate or its basic modification will be the stable solid phase in equilibrium with the calcium salts in solution in the boiler water, if the concentration of hydroxyl radical is approximately 100 or more parts per million. As hereinafter pointed out, such hydroxyl concentraton may be readily maintained by the use of trisodium phosphate which is basic in character, or by the chemicals used in the primary treatment when such treatment is employed.

Several points should be noted:

(1) As pointed out in my copending patent application Serial No. 718,322, and in my article in J. Ind. and Eng. Chem., vol. 17, No. 3, pp. 288–9 (1925), the solubility product for any substance is not wholly a constant when other ions in varying concentrations are present in the solution. We are dealing with the ratio of the solubility products, however, and I consider the constancy of the ratio sufficient to determine the concentrations to be maintained within the limits practicable in boiler operation.

(2) As indicated by the lack of constancy of the solubility product, the decrease in solubility of $CaSO_4$ in the presence of $Na_2SO_4$ is not as rapid as demanded by the solubility product principle. Thus, experimental determinations at 182 C. gave the following results:

| Concentration of $SO_4$, parts per million. | Concentration of $CaSO_4$ directly determined, parts per million. | Concentration of $CaSO_4$ calculated from solubility product, parts per million. |
|---|---|---|
| ----- | 120 | ----- |
| 923 | 81 | 66 |
| 2910 | 83 | 64 |
| 5090 | 86 | 63 |

The figures in the last column are calculated by the solubility product principle. Thus it is certain, up to a concentration of 5000 p.p.m. of $SO_4$, that when the smaller calculated values are used in deriving values for the curves shown in the drawing, the value of $PO_4$ corresponding to equality in the general expression will be sufficiently in excess to allow for variations in boiler operation.

(3) The low excess concentrations of $PO_4$ which are necessary, make it possible easily to keep within the ratio of total alkali (expressed as sodium carbonate) to sodium sulphate recommended in the "Suggested rules for the care of power boilers", preprinted from Mechanical Engineering for May, 1925, Appendix, Section CA–5, as a safeguard against embrittlement of the boiler metal. These suggested rules recommend that the total alkalinity of the boiler water expressed as sodium carbonate be not more than the total sulphate expressed as sodium sulphate for boilers of not more than 150 pounds gauge pressure; that the total alkalinity of the boiler water expressed as sodium carbonate be not more than one-half the total sulphate expressed as sodium sulphate for boilers of from 150 pounds to 250 pounds gauge pressure; and that the total alkalinity of the boiler water expressed as sodium carbonate be not more than one-third the total sulphate expressed as sodium sulphate for boilers of more than 250 pounds gauge pressure. When soda ash is used as the treating chemical, it is impracticable to maintain the desired sulphate carbonate ratio for scale prevention and meet these conditions at the higher operating pressures. In general, the hydroxyl concentration of the boiler water should preferably not exceed about 300 parts per million since, at higher hydroxyl concentrations there is a tendency to embrittlement of the boiler steel and to wet steam.

(4) If the hydroxyl concentration developed in the boiler water becomes too high because of the decomposition of carbonate resulting from pretreatment of the feed water, or for other reason, it may be diminished by using $$Na_2HPO_4, NaH_2PO_4 \text{ or } H_3PO_4$$

for the phosphate conditioning, thus gaining the double advantage of decreasing the hydroxyl concentration, and of using a chemical which contains a higher percent of the desirable phosphate radical.

As shown by the composition of the sludges developed, hydrous magnesium silicate (which forms adherent scale) and magnesium hydroxide (which forms non-adherent sludge) are solid phases deposited in the water in the boiler. The control of the deposition of the hydrous magnesium silicate as adherent scale is based upon limiting the concentration of magnesium ion in solution to a minimum value. This is accomplished by controlling the phosphate and hydroxyl ion concentration in the water, thereby decreasing the concentration of magnesium ion to the limits established by the solubility product relations of magnesium phosphate or hydroxide at the temperature in question. Thus, in the following equations denoting the equilibria which may develop, it is apparent that an increase in the hydroxyl concentration will tend to throw the equilibrium in the direction of solid magnesium hydroxide and thus to favor this being the solid phase in stable equilibrium with the magnesium ion in the water in the boiler. Thus:

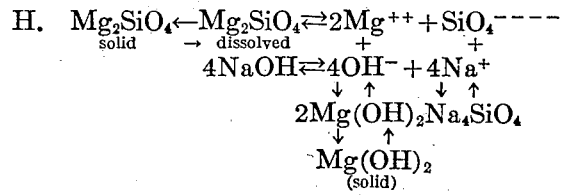

By the maintenance of a suitable concentration of $(OH)^-$, the content of Mg and the solubility of $Mg(OH)_2$ can be so reduced that the deposition of hydrous magnesium silicate is minimized. Further, the solubility of tribasic magnesium orthophosphate is of the same order or less than that of $Mg(OH)_2$, so that the $PO_4$ concentrations shown in the drawings act to lessen further the possibility of hydrous magnesium-silicate deposition.

As a specific example of the satisfactory application of this type of conditioning a boiler water, consider a boiler operating at 250 pounds pressure and using water such as that from the Monongahela River at Pittsburgh as feed water, which has approximately the following composition in parts per million:

| | |
|---|---|
| $SiO_4$ | 4 |
| Fe | 1 |
| Ca | 32 |
| Mg | 5 |
| Na | 14 |
| $HCO_3$ | 13 |
| $SO_4$ | 110 |
| Cl | 7 |

While the total treatment of this water may be made by means of phosphate radical, the preferred form is that in which the magnesium and calcium salts are removed to their equilibrium values by any process of outside of primary treatment as with lime and soda ash, cold or hot, with filtration of sludge, or the base exchange process. Dependent upon the process used, and the attention paid to making the reactions complete, the total calcium and magnesium content (expressed as calcium carbonate) of the water after primary treatment will vary from about 10 to 50 parts per million.

Suppose, further, that the blow-down of the boiler is so adjusted that sulphates are maintained at 2000 parts per million.

The control of the amount of phosphate introduced lies in the concentration of phosphate which is requisite to prevent the formation of calcium sulphate as solid phase at this operating pressure and sulphate concentration. For a boiler operating at 250 pounds pressure and with a sulphate concentration in water in the boiler of 2000 parts per million a phosphate radical concentration therein of approximately 60 p. p. m. will suffice. An excess of 100 p. p. m. over this amount will do no harm so long as the hydroxyl concentration does not rise too high. The lower hydroxyl limit is fixed by the amount necessary to prevent hydrolysis of tricalcic phosphate and to control hydrous magnesium silicate deposition and corrosion; the upper limit is fixed by the danger of wet steam and of embrittlement when the hydroxyl concentration is excessive. A preferred hydroxyl concentration will be approximately 100–300 parts per million, and will in general be furnished by the double decomposition occurring between the trisodium phosphate and calcium and magnesium carbonate and hydroxide, and by the decomposition of any sodium carbonate thus developed. Such decomposition determines the phosphate-bearing chemical used in providing the necessary phosphate concentration in the boiler water. Thus, if the decomposition results in an undesirable concentration of hydroxyl in the boiler water, this concentration may be controlled by using disodium hydrogen phosphate as the source of the phosphate radical, or in an extreme case, by using phosphoric acid.

If the sulphate radical concentration in the water in the boiler were only 1,000 parts per million, then the phosphate radical concentration therein need be but slightly over 20 parts per million; but if the operating pressure was 300 pounds gauge pressure and the sulphate radical concentration 1,000 parts per million, then the phosphate radical concentration in the water in the boiler should be slightly over 30 parts per million. These relations for any particular boiler may be worked out, if desired, from the data given above or may be directly taken from the curves shown in the drawing. The curves shown in the drawing are those which are used for actual operating conditions and indicate amounts of phosphate radical which have been found from practical, as well as theoretical considerations, to be satisfactory to prevent the formation of adherent scale.

It is not necessary for the boiler operator to accurately weigh out the amount of the treating reagent, such as trisodium phosphate. He introduces such amounts as he has found to be approximately necessary and checks the concentration by testing the boiler water from time to time, and then increases or diminishes the amount of the trisodium phosphate or other treating chemical which he is supplying. The preferred way of doing this is to dissolve the trisodium phosphate in a tank and to feed the solution continuously to the boiler or to the feed water before introduction into the boiler, the speed of the feed pump being regulated in accordance with the tests taken of the boiler water. This gives the operator at all times a continuous and direct control of conditions and insures that they will be always maintained so as to prevent the formation of the hard adherent growing scale.

The determination of the sulphate phosphate and hydroxyl concentrations may be made by any of the usual methods of analysis. A convenient method of testing for sulphates is by the well known turbidity method in which a soluble barium salt, such as barium chloride is added to a test sample of boiler water, previously acidified with hydrochloric acid, and a comparison of turbidity made with a turbid suspension of known sulphate content. A convenient form of test apparatus, using the turbidity method, is described in my copending application, Serial No. 755,721, filed December 13, 1924, and in the paper on "Simple apparatus for the control of boiler water treatment based on chemical equilibrium," Journal of Industrial and Engineering Chemistry, volume 17, page 409 (1925).

The hydroxyl concentration may be determined in any of the usual ways, such, for example, as titrating a test sample of the boiler water with standard acid solutions with such common indicators as phenolphthalein and methyl-orange. Apparatus for such determination is described in the same paper on "Simple apparatus for the control of boiler water treatment based on chemical equilibrium."

The phosphate concentrations may be also obtained by any of the usual methods of phosphate determination. A convenient method for the boiler operator is that in which the phosphate is precipitated as the yellow phosphomolybdate, the amount present in the solution being obtained by the depth of precipitate in a capillary tube attached to a pear-shaped bulb when the precipitate has settled. This tube must be calibrated in turn by means of a phosphate solution of known concentration. A standard form of such apparatus is on the market as the "Goetz" tube.

While it is preferred to make the concentration determinations by direct methods on the boiler water, the concentrations may be determined indirectly. For example, the sulphate concentration may be determined by testing the feed water to determine the amount of sulphate radical contained therein, and then the concentration of the feed water which takes place in the boiler may be determined by some means, such as a determination of the chlorine concentration in the feed and boiler water, or by knowledge of the amount of water evaporated, the moisture in the steam and the blow down. Also, if we know for any particular case the number of concentrations which the feed water undergoes in making the boiler water, and since phosphate and sulphate are not decomposed in the boiler water, it then becomes possible to introduce into the feed water the amount of phosphate radical which will be the amount demanded by the sulphate radical concentration in accordance with the curves of Figure 1 of the drawing. In th's way, the phosphate concentration in the water and the amount of phosphate to be introduced, may be indirectly determined by calculations without actually testing the boiler water for phosphate.

However, it is preferred to check the concentrations in the boiler water directly from time to time, and to regulate the amount of phosphate introduced accordingly. For example, in feed water taken from rivers, the sulphate concentration will vary considerably from month to month, or even from day to day, and such variations are immediately checked by the sulphate analysis of the boiler water.

If the external or primary removal of the calcium and magnesium salts is accomplished by means of lime and soda ash, the quantity of soda ash added in th's process will be governed by the hydroxyl concentration necessary in the water in the boiler. If the primary removal of magnesium and calcium is accomplished by a base exchange process, then the concentration of bicarbonate in this water and the use for which the steam is desired will determine its further treatment by acid or alkali in conjunction with the secondary phosphate treatment, in order to maintain the desirable relations of hydroxide, phosphate and sulphate in the boiler water.

In case the primary treatment of the water is by an evaporator, the phosphate treatment is preferably applied directly to the water in the boiler to take care of calcium and magnesium which may get into the system through foaming of the evaporator or condenser leakage, or both. It is always desirable that the water in the boiler have some hydroxyl ion concentration in order to minimize or prevent corrosion which will take place more rapidly with an acid or even a neutral water. Trisodium phosphate is a convenient way to introduce the hydroxyl ion into the water, and at the same time the phosphate introduced serves as a safeguard to prevent scale formation in case raw water gets into the system from any accidental cause such as condenser leakage.

The phosphate may be introduced into the feed water at any point following the primary treatment and filtration, or directly into the water in the boiler.

While satisfactory adjustment of phosphate concentration in relation to the sulphate concentration in the water in the boiler prevents the deposition of anhydrite scale, the same phosphate concentration and the preferred hydroxide concentration will so limit the amount of hydrous magnesium silicate in solution that its precipitation as adherent scale becomes negligible. Likewise the formation of calcium silicate scale is prevented. The removal of the calcium and the magnesium in the form of phosphates and hydroxide will, of course, influence the accumulation in the water of sulphate and silicate, which is kept within the desired limits by the blow-down. The non-adherent sludge may be removed by blow down, or a portion of the boiler water may be withdrawn, the sludge separated therefrom and the water returned to the boiler, thus obtaining the effect of the blow down in removing the sludge from the boiler, but without losing the water from the boiler system. For separating the sludge, the water from the boiler may be circulated through a filter as described, for example, in my copending application, Serial No. 718,322, filed June 6, 1924, or the sludge may be separated in other ways, as for example, by centrifuging.

The calcium and magnesium which are the principal metals that form adherent scale are both metals of the second group in the periodic system. The other metallic scale-forming constituents are, in general, negligible, and treatment to prevent the formation of calcium and magnesium scales is sufficient. The principal negative radicals encountered in boiler waters favorable to the formation of adherent scale are sulphate, silicate, and also hydroxyl, if the concentration of the last named approaches high enough limits to exceed the solubility-product limit of calcium hydroxide. In general, any negative ion which combines with a positive ion in the solution to form a salt whose solubility decreases with temperature increase, such as the combination of $CrO_4^{--}$ with $CA^{++}$ to form calcium chromate, for a still further example, is favorable to the formation of adherent scale on the heating surfaces.

While the usual lime and soda ash treatment is preferred as the primary treatment because of the cheapness of the chemicals used and its readiness of control over the hydroxyl concentration in the water in the boiler, any suitable treatment may be used, such as the base exchange, as by zeolite. Also a primary treatment may be made such as to remove sulphate; for example, a barium salt, such as carbonate, may be used in the primary treatment to remove sulphate from the feed water to the solubility of barium sulphate. Also a barium compound might be introduced into the boiler for the purpose of keeping down the sulphate concentration and thus lessen the amount of blow-down.

The present invention may be applied to the treatment of water in boilers other than pressure boilers used for boiling or heating purposes. For example, it may be employed in the devices commonly called evaporators but which are in fact really boilers in that they cause an evaporation of the water which is afterwards condensed as a distilled water for use in power-generating boilers supplying condensing engines provided with efficient condensing systems. By maintaining the ionic concentrations as herein described, the formation of troublesome scale in evaporators may be prevented. The term "steam boiler" as herein used is intended as a term of general description and not of limitation, and to include devices in which water is evaporated, whether below or above atmospheric pressures and in which a concentration of impurities results from the removal of pure water by evaporation.

While I have described at considerable length the theory upon which I believe the operation of my invention to be based, and the preferred method of carrying out the boiler water treatment, it is to be understood that the invention is not limited to the theory advanced or to the preferred details of procedure, but may be otherwise practiced within the scope of the invention as defined in the following claims.

I claim:

1. The process of preventing the formation of adherent scale by steam boiler water containing a scale-forming metal of the second group of the periodic system and a negative ion favorable to the formation of adherent scale, which comprises maintaining in the water in the boiler a concentration of a stable negative ion favorable to the formation of non-adherent sludge not less than the concentration of the negative ion favorable to the formation of scale times the ratio of the solubility product of the second group metal compound of the ion favorable to the formation of a sludge to the solubility product of the second group metal compound of the ion favorable to the formation of scale, all to their appropriate exponents, at the temperature of the water in the boiler.

2. The process of preventing the formation of adherent scale by steam boiler water containing calcium and sulphate, which comprises maintaining in the water in the boiler a concentration of a stable negative ion favorable to the formation of non-adherent sludge not less than the concentration of the sulphate ion times the ratio of the solubility product of the calcium compound of the ion favorable to the formation of sludge to the solubility product of calcium sulphate, all to their appropriate exponents, at the temperature of the water in the boiler.

3. The process of preventing the formation of adherent scale by steam boiler water containing calcium and sulphate, which comprises maintaining in the water in the boiler a concentration of phosphate ion not less than the concentration of sulphate ion to the three halves power times the ratio of the solubility product of tricalcic phosphate to the one half power to the solubility product of calcium sulphate to the three halves power, at the temperature of the water in the boiler.

4. The process of preventing the formation of adherent scale by steam boiler water containing calcium and sulphate, which comprises introducing into the water a material yielding in solution a stable negative ion in sufficient amounts to cause the precipitation of the calcium of the water in the boiler as a non-adherent sludge instead of adherent scale.

5. The process of preventing the formation of adherent scale by steam boiler water containing calcium, magnesium, sulphate and silicate, which comprises maintaining in the water in the boiler concentrations of negative ion stable under practicable boiler-operating pressures and favorable to the formation of non-adherent calcium and magnesium-containing sludges, such that the calcium and magnesium are precipitated as sludges instead of an adherent scale.

6. The process of preventing the formation of adherent scale in steam boilers using feed water containing calcium and sulphate, comprising the steps of removing a part of the calcium by a primary treatment, and thereafter subjecting the water to a secondary treatment with a stable negative radical which causes the precipitation in the water in the boiler of calcium as non-adherent sludge instead of adherent scale.

7. The process of preventing the formation of adherent scale in steam boilers utilizing feed water containing a scale-forming metal of the second group of the periodic system, comprising the steps of subjecting the water to a primary treatment to remove a part of such metal, and thereafter subjecting the water to a secondary treatment with a stable negative radical which combines with said metal to form a non-adherent sludge in the water in the boiler.

8. The process of preventing the formation of adherent scale in steam boilers utilizing feed water containing calcium and sulphate, comprising the steps of subjecting the feed water to a primary soda ash and lime treatment, and thereafter subjecting the feed water to a secondary treatment with a phosphate which causes the calcium of the water in the boiler to be precipitated as a non-adherent calcium phosphate sludge instead of an adherent calcium sulphate scale.

9. The process of preventing the formation of adherent scale in steam boilers utilizing feed water containing calcium and sulphate, comprising the steps of subjecting the water to a primary treatment to remove a part of the calcium, and thereafter subjecting the water to a secondary treatment which consists in maintaining in the water in the boiler the concentration of a stable negative ion favorable to the formation of non-adherent sludge not less than the concentration of sulphate ion times the ratio of the solubility products of the calcium compound of said stable ion to the solubility product of calcium sulphate, all to their appropriate exponents, at the temperature of the water in the boiler.

10. The process of preventing the formation of adherent scale in steam boilers utilizing feed water containing calcium and sulphate, comprising the steps of subjecting the feed water to a primary treatment for the removal of a part of the calcium, and thereafter subjecting the water to a secondary treatment which consists in maintaining in the water in the boiler a concentration of phosphate ion not less than the concentration of sulphate ion to the three halves power times the ratio of the solubility product of calcium phosphate to the one half power to the solubility product of calcium sulphate to the three halves power, at the temperature of the water in the boiler.

11. The process of preventing the formation of adherent scale in steam boilers having condensers supplied with cooling water containing calcium and sulphate, comprising the steps of supplying evaporator-purified make-up water and maintaining in the water in the boiler such concentration of phosphate radical as will cause the precipitation of calcium as non-adherent sludge sufficient to prevent the formation of anhydrite scale from calcium and sulphate introduced by condenser leakage or foaming of the evaporator or both.

12. The process of preventing the formation of adherent scale in steam boilers comprising a treatment of the feed water for such boilers with lime and soda ash to remove calcium and magnesium to their equilibrium values with carbonate ion and hydroxyl ion, respectively, a subsequent filtration of the water to remove precipitated calcium carbonate and magnesium hydroxide, and a further treatment with an alkali metal phosphate in an amount sufficiently in excess of the amount equivalent to the calcium and magnesium remaining in the filtered water to maintain a concentration of phosphate ion in the water in the boiler greater than the ratio of the solubility product of tricalcic phosphate to the one half power to the solubility product of calcium sulphate to the three halves power at the temperature of the water in the boiler, all times the concentration of the sulphate ion to the three halves power.

13. The process of preventing the formation of adherent scale by steam boiler water containing calcium and sulphate, which comprises maintaining in the water in the boiler a sufficient concentration of phosphate ion to cause the precipitation of the calcium as a non-adherent calcium phosphate instead of adherent scale.

14. The process of preventing the formation of adherent scale by steam boiler water containing a scale-forming metal of the second group of the periodic system and a negative ion favorable to the formation of adherent scale, which comprises maintaining in the water in the boiler a sufficient concentration of a stable ion favorable to the formation of a non-adherent sludge that the second group metal is precipitated as a non-adherent sludge-forming compound instead of adherent scale.

15. The process of preventing the formation of adherent scale by steam boiler water containing calcium and sulphate, which comprises determining the sulphate concentration of the water and on the basis of such determination introducing phosphate in such amounts as to cause precipitation of the calcium of the water in the boiler as non-adherent calcium phosphate instead of calcium sulphate scale.

16. The process of preventing the formation of adherent scale by steam boiler water containing calcium and sulphate, which comprises determining the sulphate concentration of the water and on the basis of such determination introducing a material yielding in solution a stable negative ion favorable to the formation of a non-adherent sludge-forming calcium salt in such amounts as to cause precipitation of the calcium of the water in the boiler as a non-adherent sludge instead of calcium sulphate scale.

17. The process of preventing the formation of adherent scale by steam boiler water containing calcium and sulphate, which comprises maintaining in the water in the boiler sufficient concentrations of phosphate and hydroxyl to cause the precipitation of the calcium as tricalcic phosphate instead of calcium sulphate.

18. The process of preventing the formation of adherent scale by steam boiler water containing calcium and sulphate, which comprises introducing phosphate into the water, from time to time determining the concentrations of phosphate and sulphate in the water, and on the basis of such determinations adding as required more phosphate in amounts sufficient to maintain in the water in the boiler such relative concentrations of phosphate, sulphate and calcium that the solubility product of calcium phosphate will be exceeded before the solubility product of calcium sulphate is reached at the temperature of the water in the boiler.

19. The process of preventing the formation of adherent scale by steam boiler water containing calcium and sulphate, which comprises introducing into the water phosphate in sufficient amounts to cause the precipitation of calcium phosphate as sludge in the boiler, continually removing a portion of the water form the boiler, separating the calcium phosphate sludge therefrom, and returning the water to the boiler.

20. The process of preventing the formation of adherent scale by steam boiler water containing a scale forming metal of the second group of the periodic system and a negative ion favorable to the formation of adherent scale which comprises maintaining in the water in the boiler such relative concentrations of the second group metal, the negative ion favorable to the formation of adherent scale and a negative ion favorable to the formation of a non-adherent sludge-forming salt that the second group metal is precipitated as a non-adherent sludge instead of adherent scale, and maintaining a hydroxyl concentration in the boiler water of not more than about 300 parts per million.

21. The process of preventing the formation of adherent scale by steam boider water containing calcium and sulphate, which comprises maintaining in the water in the boiler sufficient concentrations of phosphate and hydroxl to cause the precipitation of the calcium as tricalcic phosphate instead of calcium sulphate, the hydroxyl concentration being below that which would objectionably augment the amount of moisture in the steam.

22. The process of preventing the formation of adherent scale by steam boiler water containing calcium and sulphate, which comprises maintaining in the water in the boiler sufficient concentrations of phosphate and hydroxyl to cause the precipitation of the calcium as tricalcic plhosphate instead of calcium sulphate, the hydroxyl concentration being not over about 300 parts per million.

23. The process of preventing the formation of adherent scale by steam boiler water containing a scale-forming metal of the second group of the periodic system and a negative ion favorable to the formation of any adherent scale, which comprises maintaining in the water in the boiler such relative concentrations of the second group metal, the negative ion favorable to the formation of adherent scale and a negative ion favorable to the formation of a non-adherent sludge-forming salt that the second group metal is precipitated as a non-adherent sludge instead of adherent scale, while maintaining the boiler water in an alkaline condition which is not sufficiently great to objectionably augment the moisture in the steam.

24. The process of preventing the formation of adherent scale in steam boilers using feed water containing calcium and sulphate, which comprises pretreating the water with a barium compound to reduce its sulphate, and maintaining in the water in the boiler a concentration of a negative ion favorable to the formation of non-adherent sludge not less than the concentration of the sulphate ion times the ratio of the solubility product of the calcium compound of the ion favorable to the formation of sludge to the solubility product of calcium sulphate, all to their appropriate exponents, at the temperature of the water in the boiler.

25. The process of preventing the formation of adherent scale in steam boilers using feed water containing calcium and sulphate, which comprises decreasing the sulphate concentrations by means of a barium compound and maintaining in the water in the boiler a sufficient concentration of phosphate ion to cause the precipitation of the calcium as a non-adherent calcium phosphate instead of adherent scale.

In testimony whereof I have hereunto set my hand.

RALPH E. HALL.